United States Patent [19]

Sharber

[11] Patent Number: 4,825,810
[45] Date of Patent: May 2, 1989

[54] ELECTRIC BARRIER FOR FISH

[76] Inventor: Norman G. Sharber, P.O. Box 1059, Flagstaff, Ariz. 86002

[21] Appl. No.: 97,538

[22] Filed: Sep. 16, 1987

[51] Int. Cl.$^4$ .............................................. H01K 1/00
[52] U.S. Cl. ......................................... 119/3; 43/17.1
[58] Field of Search ..................... 43/17.1; 119/2, 3, 4

[56] References Cited

U.S. PATENT DOCUMENTS 1,269,380  6/1918  Burkey ..................................... 119/3
3,363,356  1/1968  Kreutzer ............................. 43/17.1

Primary Examiner—Richard K. Seidel
Attorney, Agent, or Firm—Cahill, Sutton & Thomas

[57] ABSTRACT

A fish barrier to prevent passage there past of fish is established by applying alternating asymmetrical pulses across water immersed anode and cathode electrodes, where the cathode electrode represents the barrier. A higher voltage negative pulse produces a direct current field in a first zone adjacent the cathode electrode which zone is sensed by the fish at a threshold value of field intensity. The first zone induces a neuromuscular twitch response to turn the fish away from the negative electrode. A lower voltage positive pulse produces an alternating current field in a second zone closer to the cathode electrode, which zone is sensed only by those fish in close proximity to the cathode electrode. The second zone induces muscular contraction followed by tetany and usually death. By placing the cathode electrode across a stream or canal to prevent upstream fish movement, most of the fish will be involuntarily prevented from swimming close to the barrier. The dying and dead fish which did swim too close to the cathode electrode will be carried downstream and away from the barrier by the water flow. The use of alternating pulses of essentially equal energy level prevents degradation of the field intensity by preventing a build-up of metallic oxides on the cathode electrode due to electrolysis.

20 Claims, 2 Drawing Sheets

ELECTRIC BARRIER FOR FISH

BACKGROUND OF THE INVENTION

1. Field of the Invention

The present invention relates to electric barriers and, more particularly, to electric barriers for fish.

2. Description of Prior Art

For decades, a fishing technique known as electrofishing has been employed for the purpose of collecting fish in conjunction with scientific research projects and for commercial fishing purposes. Generally, such technique employs either an alternating current system or a direct current or pulsed direct current system. In an alternating current system, fish within the threshold value of field intensity are immobilized either through electronarcosis or electrotetanus. The immobilized fish are collected either through use of an underwater vacuum system (siphon) or by net handlers dipping for the fish. Very often, a substantial percentage of the fish are immobilized below the electrodes and at a substantial depth where they are not retrievable. Moreover, a certain percentage of the dead or dying fish sink or are too far away to be retrieved. Because an alternating current system usually results in immediate or subsequent death of the fish, the system is seldom used for scientific studies involving inspection, tagging and release of the fish.

In a direct current or pulsed direct current system, the electrical field in proximity to the anode electrode will produce a neuromuscular twitch response in the fish which forces the fish to swim toward the anode electrode. The resulting concentration of fish in proximity to the anode electrode permits collection of the fish by an underwater vacuum (siphon) system or by net handlers netting the fish. Usually, the fish are not permanently injured or damaged by the field produced by the direct current or pulsed direct current.

One very serious problem with the direct current system is that related to electrolysis which results in a deposition of metallic oxides upon the cathode electrode. Such metallic oxides have electrical insulatng properties. The build up of such deposits will increasingly degrade the strength of the electrical field about the anode. A further detriment of the direct current system is that the electrical field strength produced is generally less than the electrical field strength produced by an alternating current system having the same power output. However, a pulsed direct current system appears to provide an electrical field strength commensurate with that of an alternating current system but still suffers from the other detriments of a direct current system.

SUMMARY OF THE INVENTION

The present invention is directed to an electrical screen or barrier for preventing passage of fish therepast. A pair of alternating asymmetrical pulses are transmitted between water immersed anode and cathode electrodes. A high voltage negative pulse establishes a first zone having a threshold value of field intensity at a first distance from the cathode electrode sufficient to produce a neuromuscular twitch in the fish which causes the fish involuntarily to swim away from the cathode electrode. A second lower voltage positive pulse establishes a second zone having a threshold value of field intensity substantially closer to the cathode electrode. Any fish which manages to enter the second zone is subjected to alternating current pulses which stimulate the muscle cells in the fish to repetitively contract with limited muscular relaxation between contractions. Finally, the fish becomes exhausted and the muscles remain contracted (electrotetanus or tetany) and the fish is immobilized. Usually, the fish suffer sufficient injury to result in death. Because of the use of asymmetrical alternating current pulses and by maintaining the energy level of the positive and negative pulses essentially equal, deposition of metallic oxides on the cathode electrode with resulting degradation of the two field strengths will not occur. By placing the barrier across a stream or canal to prevent upstream movement of the fish, any dead or dying fish are swept downstream from the barrier.

It is therefore a primary object of the present invention to provide an electric barrier for fish.

Another object of the present invention is to provide an electrically induced barrier to prevent fish swimming therepast.

Yet another object of the present invention is to provide apparatus for inducing fish in a first zone adjacent a barrier to swim away from a barrier and for immobilizing fish within a smaller second zone adjacent the barrier.

Still another object of the present invention is to prevent movement of live fish past a barrier extending across a waterway.

A further object of the present invention is to provide apparatus for generating alternating asymmetrical pulses which establish a first and a second zone of electrical fields adjacent a barrier to turn away or immobilize, respectively, fish approaching a barrier.

A yet further object of the present invention is to provide an electric barrier formed by an immersed cathode electrode to prevent fish swimming therepast while precluding a build up of metallic oxides upon the cathode electrode.

A still further object of the present invention is to provide a method for precluding fish from swimming past a barrier extending across a waterway.

A still further object of the present invention is to provide a method for repelling fish within a first zone attendant an immersed electric barrier and immobilizing any fish entering a second zone closer to the barrier.

These and other objects of the present invention will become apparent to those skilled in the art as the description thereof proceeds.

DESCRIPTION OF THE PREFERRED EMBODIMENT

Figure 1:
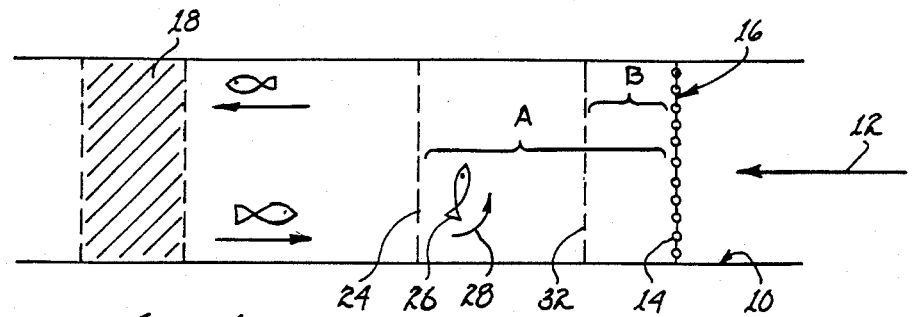
FIG. 1 illustrates the fish reaction to the DC electrical field created in a first zone adjacent a barrier mounted across a waterway.

Referring to FIG. 1, there is illustrated a water passageway, such as a stream, channel or canal 10. The water flow through the canal is in the direction indicated by arrow 12. One or more electrodes 14 are placed across the canal to form a barrier 16. For purposes of nomenclature, electrodes 14 will be referred to as cathode electrodes. Downstream of barrier 16 is a second electrode 18 which will be referred to an an anode electrode. The anode electrode may be a flat plate or a plurality of electrodes extending across canal 10. Alternatively, the anode may be an electrically conducting stake driven into the ground proximate canal 10 or into the bottom of the canal. The anode and cathode electrodes are connected to a source of alternating asymmetrical electrical pulses.

As will be described in further detail below, the source of alternating asymmetrical pulses produces a negative pulse of a first net voltage value and a second positive pulse of a substantially lesser net voltage value. The duration of each of the pulses is inversely proportional to its maximum net voltage value in an effort to produce alternating pulses which have approximately an equal energy level. Such equality in energy level will tend to prevent build up of metallic oxides upon the electrodes, particularly the cathode electrode. Thus, the electric field strengths attendant the electrodes will not be degraded due to the insulating effect of deposition of metallic oxides thereupon.

Figure 3:
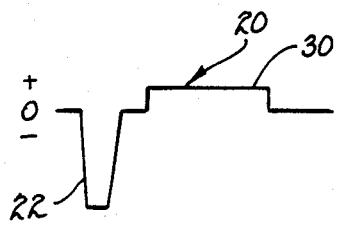
FIG. 3 illustrates a waveform of the electrical pulses which generate the electrical fields present in the first and second zones.

The waveform of the pulses may be a squarewavefrom 20, as illustrated in FIG. 3. Negative pulse 22 will establish an electrical field downstream of barrier 16, as represented by the zone A. The line identified by numeral 24 depicts the threshold value of field intensity (TVFI) at which point there will be induced in fish swimming upstream toward barrier 16 the desired neuromuscular twitch response. Usually, the threshold value is considered to be three to four volts across the fish from head to tail. As depicted in FIG. 1, a fish 26 having swam past line 24 will twitch involuntarily resulting in a turning motion of the fish, as represented by arrow 28 with continued tail movement to propel the fish away from barrier 16. Accordingly, any fish within the water downstream of the barrier within the area demarcated as zone A will be involuntarily turned away from the barrier.

Figure 2:
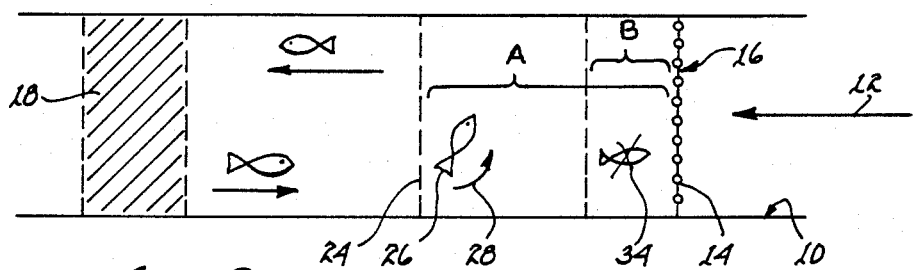
FIG. 2 illustrates the fish reaction to the AC electrical field created in a second zone adjacent a barrier mounted across the waterway.

Positive going pulse 30 produces a TVFI downstream of barrier 16 within the area identified by zone B and generally terminated at line 32. As illustrated in FIG. 2, a fish 34 swimming upstream past line 32 will be within the TVFI produced by positive pulse 30, zone B. Additionally, the TVFI produced by pulse 22, zone A, is alternately within the same area. The resulting alternating current pulses to which fish 34 is subjected will cause involuntary muscular contractions until the fish becomes sufficiently exhausted to prevent relaxation of the muscle cells between the cyclical contractions. Tetany will set in and the fish will become immobilized and possibly eventually die. Because of the direction of water flow, as indicated by arrow 12, immobilized or dead fish 34 will be swept downstream and away from barrier 16.

Figure 4:
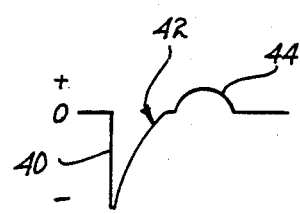
FIG. 4 illustrates a preferred waveform of pulses for generating electrical fields in first and second zones adjacent a fish barrier.
Figure 5:
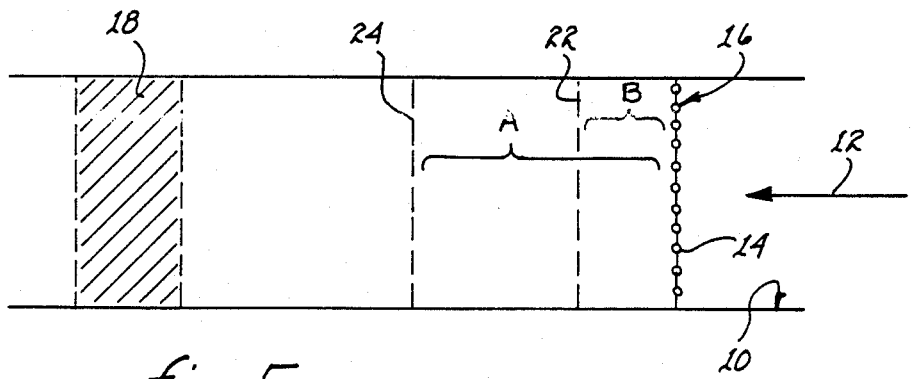
FIG. 5 illustrates the extended DC electrical field created in a first zone by the negative pulse of the waveform illustrated in FIG. 6.

By developiong a sharp leading edge and an exponentially decaying trailing edge of a negative pulse 40 of waveform 42, as illustrated in FIG. 4, line 24 can be extended downstream of barrier 16, as illustrated in FIG. 5. By empirical analysis, it has been learned that such a wave form, rather than just the voltage of the pulse, will create an extension of the TVFI over a different wave form pulse of the same voltage. The resulting extended zone A of the TVFI produced by pulse 40 will subject any fish swimming upstream in canal 10 toward barrier 16 for a longer period of time to an induced neuromuscular twitch response. Such longer period of time will tend to increase the effectiveness of barrier 16 without injuring or destroying the fish. Through experimentation it has been learned that a positive going pulse 44 having a general dome shape, as illustrated in FIG. 4, is more effective in producing tetany in the fish that a square wave positive pulse. The reasons for this result have not been fully explored and are not fully presently completely understood. Nevertheless, it is known that the TVFI upstream of line 32 and within zone B is more effective in producing tetany in any fish swimming into zone B.

Figure 6:
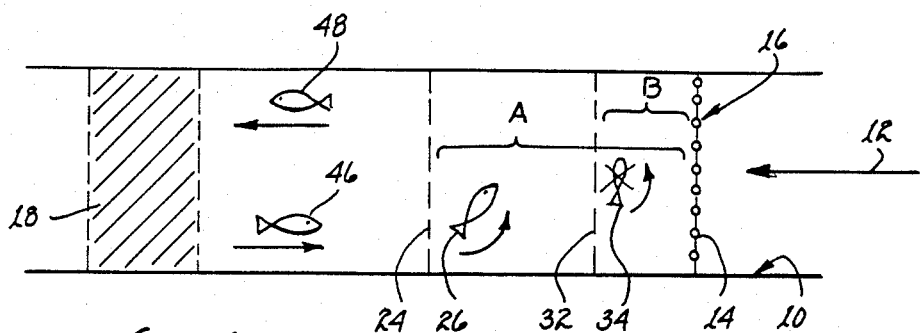
FIG. 6 illustrates the responses of fish in the first and second zones of electrical fields generated by pulses of the wave from illustrated in FIG. 6.

As illustrated in FIG. 6, fish 46, 48 downstream of line 24 are free to swim upstream or downstream essentially unaffected by the electrical field between cathode electrode 14 and anode electrode 18. Fish 26 upstream of line 24 and within zone A are subjected to an induced neuromuscular twitch which will result in the fish swimming downstream away from barrier 16. Any fish 34 swimming upstream past line 32 will suffer tetany and become immobilized and may die. The force of the water flowing downstream, as depicted by arrow 12, will wash immobilized or dead fish 34 downstream of barrier 16. Accordingly, barrier 16 is effective in precluding any voluntary or involuntary movement of fish upstream therepast.

Figure 7:
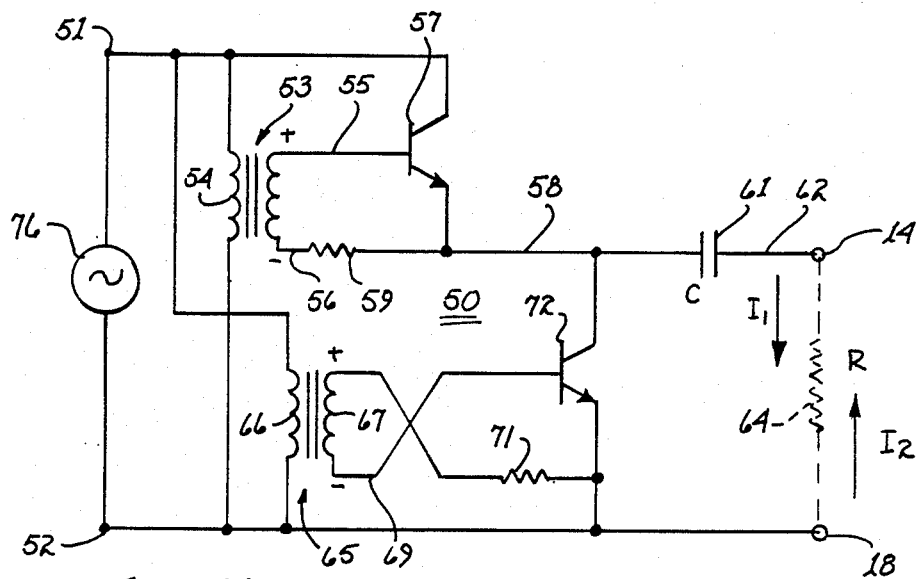
FIG. 7 illustrates a circuit for generating the waveform depicted in FIG. 6.
Figure 8:
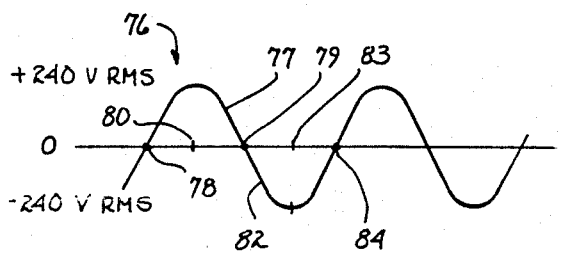
FIG. 8 illustrates the waveform of the input voltage.

Referring to FIG. 7, there is illustrated a circuit for developing the type of waveform depicted in FIG. 4. In FIG. 7, circuit 50 includes two terminals 51 and 52 to which an AC input signal 76, shown in FIG. 8, is applied. AC signal 76 can be a 240 volt RMS AC signal.

Transformer 53 has a primary winding 54 connected between conductors 51 and 52 and a secondary winding 55 connected between terminals 55 and 56. The base of NPN transistor 57, which can be a Motorola MJ10025 power transistor, is connected to terminal 55. The collector of transistor 57 is connected to conductor 51, and the emitter of the transistor is connected to conductor 58. A resistor 59, which can have a resistance of 150 ohms, is connected between conductors 56 and 58. Conductor 58 is connected to one terminal of a 10 microfarad capacitor 61, the other terminal of which is connected to output conductor 62. Output conductor 62 is connected to a submerged electrode 14. The circuitry including transformer 53 and transistor 57 performs the function of charging capacitor 61, as subsequently described.

Transformer 65 has a primary winding 66 connected between AC input conductors 51 and 52. The secondary winding 67 of transformer 65 is connected between conductors 68 and 69. Conductor 69 is connected to the base of a second NPN transistor 72, which also can be a Motorola MJ10025 power transistor. Its collector is connected to conductor 58, and its emitter is connected to conductor 52. A resistor 71, which can have a resistance of 270 ohms, is connected between terminal 68 and conductor 52. (The resistances of resistors 59 and 71 were selected to minimize power consumption of the circuit.) A second submerged electrode 18 is connected to conductor 52.

The resistance of the water between electrodes 63 and 73 is designated by reference numeral 64, and can have a resistance R of about 25 ohms. A current $I_1$ flows through the water resistance R during charging of capacitor 61 and a reverse current $I_2$ flows through R during discharging of capacitor 61. The portion of the circuitry including transformer 65 and transistor 72 performs the function of discharging capacitor 61.

Figure 9:
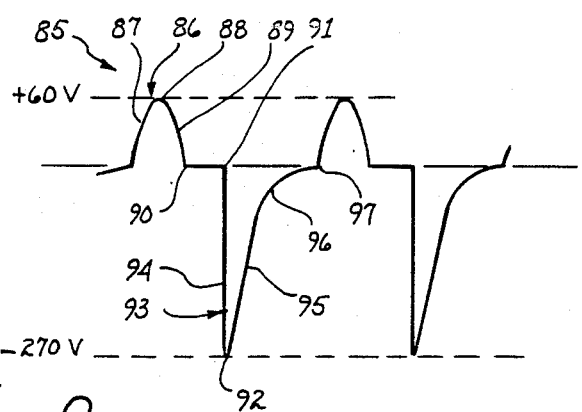
FIG. 9 illustrates the waveform of the output pulses.

The voltage produced between electrodes 14 and 18 is shown by output voltage waveform 85 in FIG. 9. In accordance with the present invention, a 60 cycle AC waveform 76 shown in FIG. 8 is applied between terminals 51 and 52 and causes circuit 50 to produce the output voltage waveform 85 across the water resistance R shown in FIG. 7. The positive pulse 86 of output waveform 85 are substantially lower in amplitude than the negative pulse. However, the charge carried through the water resistance R during the positive excursions is equal to the charge carried in the opposite direction through the water resistance R during the negative excursions of output waveform voltage 85. The large negative amplitude effectively establishes a direct current electrical field which induces involuntary neuromuscular responses in the fish to turn them away from the negative electrode. The lower amplitude, longer duration upper excursion of waveform 86 establishes an alternating current electrical field which induces tetany in the fish and the fish becomes immobilized. The negative charge associated with the negative excursion and the positive charge associated with the positive excursion being equal prevent deposition of metallic oxide contaminants on either of electrodes 14, 18.

The operation of the circuit 50 can be understood by initially assuming that the AC input waveform 76 is at "zero crossing point" 78 at the beginning of positive pulse 77, and that capacitor 61 is initially completely discharged. During the rising portion of pulse 77, the current through primary winding 54 of transformer 53 generates a 12 volt RMS signal across secondary winding 55A between terminals 55 and 56, thereby turning on switching transistor 57. This causes conductor 58 to generally "follow" the rising AC input voltage on conductor 51 in accordance with the time constant RC, wherein, the rising voltage on conductor 51 charges capacitor 61, and causes the current I1 to flow through the water resistance R from electrode 14 to electrode 18. As the voltage on conductor 58 rapidly rises, causing the current I1 to produce a steep leading edge 87 (FIG. 9) of positive pulse 86 of output voltage waveform 85, the voltage across water resistance R rises to a peak 88 of about 60 volts. Current I1 then begins to decrease rapidly and the voltage on conductor 58 approaches the voltage on AC input conductor 51, as capacitor 61 is charged in accordance with a time constant RC, C being the capacitance of capacitor 61. As the current through transistor 57, capacitor 61, and water resistance R diminishes, the voltage waveform 85 between electrodes 14 and 18 decreases sharply, as indicated by numeral 89 in FIG. 9. The conduction of current through transition 37 continues until the voltage across transformer terminals 55 and 56 fall to a voltage level which no longer maintains transistor 57 in an on condition. No more current flows into capacitor 61 or through water resistance 64, so the output voltage between electrodes 14 and 18 is zero from point 90 to point 91 in FIG. 9.

During the negative excursion 82 of AC input waveform 76, the amplitude of the voltage between the terminals 68 and 69 of secondary winding 67 initially increases in value sinusoidally, providing a corresponding voltage between secondary winding terminals 68 and 69 that rapidly turns on switching transistor 72. It should be noted that at the time transistor 72 is rapidly switched on (in response to the leading negative edge of portion 82 of AC input signal 76), capacitor 61 already is fully charged to roughly 270 volts. This causes a very large initial value of current I2 to flow through transistor 72, into capacitor 61, and through water resistance 64 when transistor 72 is switched on. This very large initial current produces a very steep negative leading edge 94 of negative pulse 93 of output voltage waveform 85, leading to a negative peak 92 of about −270 volts. From that point on, the negative portion 82 of AC input waveform 76 maintains switching transistor 72 in its on condition, so that exponential discharging of capacitor 61 occurs in accordance with the time constant RC; the steep leaidng edge 95 is followed by an increasingly gradual discharge 96 until point 97, at which time AC input waveform 76 crosses zero crossing point 84. The above sequence then is repeated.

Since the amounts of charge required to charge and discharge capacitor 61 are equal, the oxide electrodeposition problem on the electrodes (14, 18) is avoided.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A water immersed barrier for inhibiting fish swimming therepast, said barrier comprising in combination:
   (a) at least one cathode electrode for defining said barrier;
   (b) at least one anode electrode disposed toward the source of fish from said cathode electrode;
   (c) means for establishing a first threshold value of field intensity with negative polarity pulses within a first zone of said cathode electrode to repel further swimming movement of the fish toward said cathode electrode; and
   (d) further means for establishing a second threshold value of field intensity with positive polarity pulses within a second zone of said cathode electrode to subject any fish within said second zone to alternating polarity pulses to induce electrotetanus and immobilize such fish, said second zone being smaller than and within said first zone, said negative polarity pulses being of a greater net voltage then said positive polarity pulses;

whereby, said barrier initially repels and then immobilizes any fish containing to swim toward said barrier.

2. The barrier as set forth in claim 1 wherein the energy levels of said positive and negative pulses are approximately equal.

3. The barrier as set forth in claim 1 wherein said negative pulse include a sharp leading edge and an exponentially decaying trailing edge.

4. The barrier as set forth in claim 3 wherein said positive pulses is generally dome shaped.

5. The barrier as set forth in claim 1 wherein the electrical field within said first zone is primarily a direct current field.

6. The barrier as set forth in claim 1 wherein the electrical field within said second zone is primarily an alternating current field.

7. The barrier as set forth in claim 6 wherein the electrical field within said first zone is primarily a direct current field.

8. The barrier as set forth in claim 1 wherein a barrier extends at least partially across said waterway.

9. The barrier as set forth in claim 8 wherein said anode electrode is disposed within the waterway downstream of said barrier and wherein said barrier is intended to repel movement of fish upstream therepast.

10. The barrier as set forth in claim 9 wherein the waterway is a canal.

11. The barrier as set forth in claim 9 wherein the waterway is a stream.

12. A method for preventing fish from swimming past a barrier, said method including the steps of:
(a) establishing a first threshold value with negative polarity pulses of field intensity within a first zone of the barrier for repelling further swimming movement of the fish toward the barrier; and
(b) further establishing a second threshold value of field intensity with positive polarity pulses of a net voltage lesser than that of the positive polarity pulses within a second zone within the first zone of the barrier for subjecting any fish swimming into the second zone to alternating polarity pulses to induce electrotetanus and immobilze such fish.

13. The method as set forth in claim 12 including the step of preventing deposition of metallic oxides upon the barrier to avoid degradation of the first and second thresholds of field intensity.

14. The method as set forth in claim 12 including the step of locating the barrier at least partially across a waterway.

15. The method as set forth in claim 12 including the step of locating the barrier at least partially across a waterway to prevent upstream moment of the fish.

16. The method as set forth in claim 12 wherein said step of establishing includes the step of developing primarily a direct current field within the first zone.

17. The method as set forth in claim 12 wherein said step of further establishing includes the step of imposing primarily an alternating current field within said second zone.

18. The method as set forth in claim 17 wherein said step of establishing includes the step of developing primarily a direct current field within the first zone.

19. The method as set forth in claim 18 including the step of locating the barrier at least partially across a waterway to prevent upstream moment of the fish.

20. A method for preventing fish from swimming past a barrier, said method comprising the steps of:
(a) establishing a first threshold of field intensity within a first zone of the barrier for immobilizing further swimming movement of the fish toward the barirer, said step of establishing including the steps of:
  (1) applying an AC power signal by means of first and second input conductors to each of primary windings of first and second transformers to produce a first control signal on a secondary winding of the first transformer and to produce a second control signal on a secondary winding of the second transformer;
  (2) turning on a first transistor in response to the first control signal during a positive rising portion of the AC power signal to cause a current to flow from the first input conductor into a first terminal of a capacitor, a second terminal of which capacitor is connected to a submerged cathode electrode, and causing current to flow through the resistance of water in which the cathode electrode is submerged from the second terminal of the capacitor, the second input conductor being connected to a submerged anode electrode, whereby there is developed a positive voltage pulse across the resistance of the water which pulse is sensed by the fish in the first zone and upon such sensing induces muscular contraction in the fish followed by tetany and usually death;
  (3) turning off the first transistor as the AC power signal reaches a positive peak, causing current through the capacitor and the resistance of the water to fall to zero, and thereby causing the positive voltage pulse to return to zero;
(b) establishes a second threshold of field intensity within a second zone of the barrier for repelling any fish swimming into the second zone, which second zone extends beyond the first zone, said step of establishing including the steps of:
  (1) during a next negative portion of the AC power signal immediately after the positive portion, turning on a second transistor in response to the second control signal and causing a large initial current to flow through the second transistor, the capacitor and the resistance of the water to produce a negative voltage pulse across the resistance of the water, the amplitude of the negative pulse being substantially greater than the amplitude of the positive voltage pulse, which pulse is sensed by the fish in the second zone and upon such sensing induces a neuromuscular twitch response to turn the fish away from the cathode electrode before the fish reach the first zone;
  (2) allowing current through the second transistor, the capacitor, and the resistance of the water to decay exponentially from a maximum value towards zero in accordance with a time constant equal to the product of the capacitance of the capacitor and the water resistance, causing the charge associated with the positive voltage pulse to be equal to the charge associated with the negative voltage pulse, whereby, build up of metallic oxides on the cathode electrode due to electrolysis is prevented and the size of the first and second zones will not materially be reduced by continuing operation of the barrier; and
(c) repeating steps (a) and (b) for the duration the barrier is to remain operative.

* * * * *